United States Patent Office 2,918,083
Patented Dec. 22, 1959

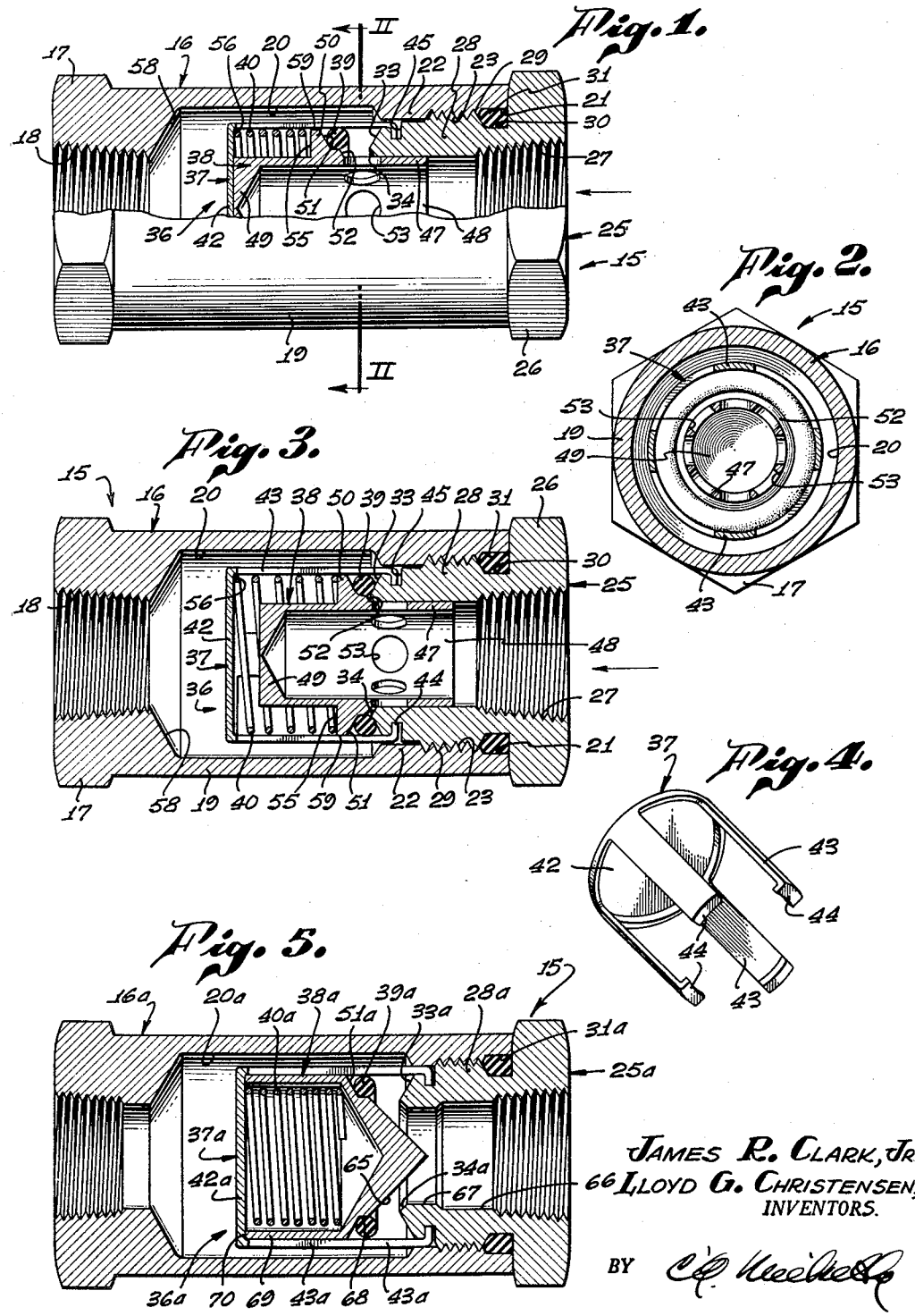

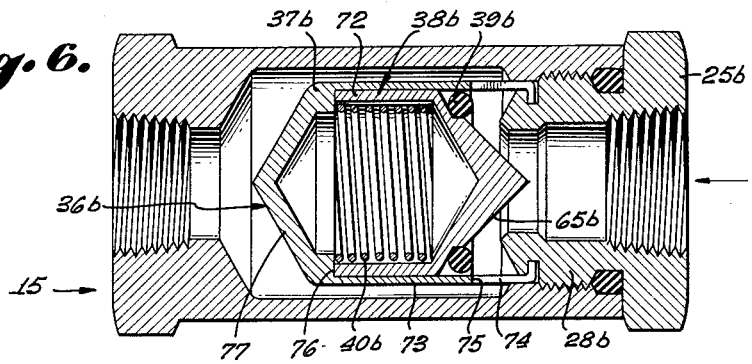
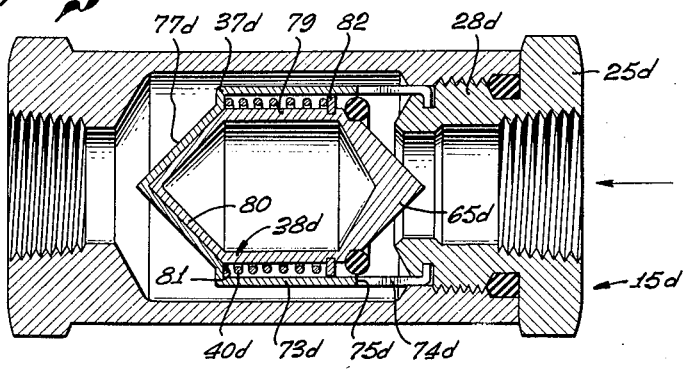
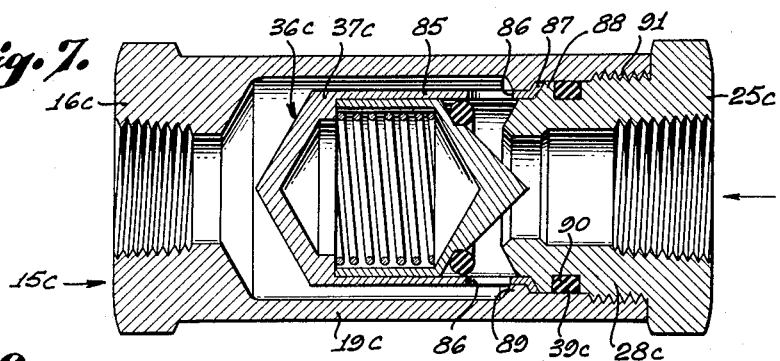
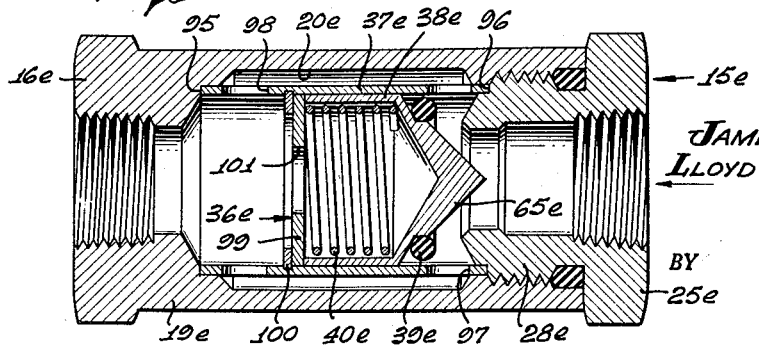
James R. Clark, Jr.
Lloyd G. Christensen,
INVENTORS.
ATTORNEY.

2,918,083

CHECK VALVE AND CAGE CONSTRUCTION

James R. Clark, Jr., Glendale, and Lloyd G. Christensen, Pasadena, Calif., assignors to James-Pond-Clark, Pasadena, Calif., a partnership composed of Ralph W. James and James R. Clark, Jr.

Application June 7, 1954, Serial No. 434,710

8 Claims. (Cl. 137—515.5)

This invention relates to a sensitive check valve adapted for use in low and high pressure fluid lines and more particularly to a check valve construction having improved operating characteristics and an improved arrangement for assembly and testing of the valve.

Prior proposed check valves have included a valve chamber within which is positioned a movable poppet, said poppet being associated with a resilient annular seal ring. A spring is normally positioned in the flow path of fluid in the valve for biasing the poppet element to compress said seal ring when in valve closed position. Such prior check valves employing biased poppets and resilient seal rings were so constructed that the spring means were in the flow path of fluid through the valve, the poppet under certain conditions might violently open, and the poppet was unsatisfactorily guided in its movement so that uneven poppet wear would occur. In addition such prior poppet valve constructions were so arranged that upon surge flow of fluid through the valve the annular seal ring would often become washed over a supporting portion of the poppet and would thereby become inoperable or unevenly worn. Such prior poppet valve constructions could only be tested after the valve had been completely assembled.

This invention contemplates an improved check valve construction utilizing an axially movable poppet valve element and an annular resilient, elastic seal ring in cooperation therewith wherein the poppet valve element, the seal ring and the spring biasing the valve element into closed position are assembled and retained within a cage member which is connected to one of the valve body members. The poppet valve construction is so designed that the flow path of fluid through the valve is over and around the poppet valve assembly so that the major portion of the poppet valve element and the biasing spring therefor are positioned outside of the flow path. The cage member provided in this invention also serves to guide the poppet valve element in its axial movement and to retain the resilient seal ring in proper position during surge flow. The cage member and the poppet valve element are so constructed and arranged that the poppet valve element is prevented from violently opening, and instead the valve element is smoothly and gently opened.

The primary object of this invention therefore is to disclose and provide a check valve having improved operating characteristics and having a novel arrangement for assembly thereof.

An object of this invention is to disclose and provide a check valve wherein a poppet valve assembly is connected to one of the valve body members and is adapted to be handled as a unit therewith.

Another object of this invention is to disclose and provide a poppet valve assembly associated with a valve body member wherein testing and inspection of the check valve is facilitated.

A further object of this invention is to disclose and provide a check valve construction wherein a poppet valve assembly is so arranged that the biasing spring therefor is positioned out of the flow path of fluid, and in open position flow of fluid passes over and around the poppet valve assembly.

A still further object of this invention is to disclose and provide a poppet valve assembly for a check valve which includes a cage member so designed as to cooperate with a poppet valve element guided thereby to cushion and smooth opening movement of the popppet valve element.

A still further object of this invention is to disclose and provide a check valve wherein uneven wear on a poppet valve element operable therein is substantially eliminated.

Generally speaking, this invention contemplates a check valve wherein a valve body includes a cylindrical housing portion having a valve chamber therewithin and an open end and a male body member adapted to carry and support a poppet valve assembly which may be positioned as a unit within the valve chamber by insertion through the open end of the housing portion. The poppet valve assembly comprises a cage member guidably positioning therewithin a poppet valve element having a wall for directing fluid over the upstream end of the assembly. Also within the cage member is retained an annular seal ring of O type cooperable with an annular valve seat provided on the poppet valve element and an opposed valve seat provided on the inner end of the male body member. A spring means is compressed between the poppet valve element and one end of the cage member for biasing the poppet valve element in an upstream direction for normally compressing the annular seal ring between said valve seats. In addition, the poppet valve element and the male body member are provided with inner valve seats which in normal closed position are in metal-to-metal contact.

These and other objects and advantages of this invention will be readily apparent from the following description of the drawings wherein several exemplary embodiments of this invention are illustrated.

In the drawings:

Fig. 1 is a side view of a check valve embodying this invention, the view being partly in section, the section being taken in a vertical plane bisecting the valve.

Fig. 2 is a sectional view taken in the transverse plane indicated by line II—II of Fig. 1.

Fig. 3 is a longitudinal sectional view of the valve shown in Fig. 1 with the valve in closed position.

Fig. 4 is a perspective view of a cage member used in the valve shown in Figs. 1 to 3.

Fig. 5 is a longitudinal sectional view of a modification of the check valve of this invention.

Fig. 6 is a longitudinal sectional view of still another modification of this invention.

Fig. 7 is a longitudinal sectional view of still another modification of this invention.

Fig. 8 is a longitudinal sectional view of another modification of this invention.

Fig. 9 is a longitudinal sectional view of another modification of this invention.

In Figs. 1 to 3 inclusive a check valve 15 embodying this invention includes a female body member 16 provided with a polygonal head portion 17 at one end, said head portion having internal tapered threads 18 for connection to a conduit and providing an outlet port for the check valve. Extending from one side of head portion 17 is an elongated cylindrical housing portion 19 defining therewithin a valve chamber 20 and having an open end 21. Spaced inwardly from the open end 21 the cylindrical portion may be formed with an internal radially inwardly directed flange 22. Outwardly from said flange 22 internal threads 23 may be provided for threaded connection to a male plug body member 25.

The male body member 25 may comprise a polygonal head portion 26 provided with internal tapered threads 27 for connection to a fluid conduit and for providing an inlet port. The male body portion 25 also includes a cylindrical hollow extension 28 provided with external threads 29 for engagement with the threads 23 of the housing portion 19. The external threads 29 on the extension 28 may be spaced from the polygonal head 26 to provide an annular space 30 therebetween which is adapted to receive a resilient gasket 31 adapted to be compressed when the two body members are interconnected to afford a seal therebetween.

The cylindrical extension 28 on the male body member 25 extends inwardly to the inner side of the internal flange 22 on the housing portion 19. At its inner end the cylindrical extension may be provided with an external annular tapered valve seat 33 and an angularly related internal annular inwardly tapered valve seat 34, both seats 33 and 34 facing in the downstream direction of normal flow of fluid through the valve.

A poppet valve assembly generally indicated at 36 is carried by the male body member 25 and generally includes a cage member 37, a poppet valve element 38, an annular resilient, elastic seal ring 39 and a coil spring 40. The cage member 37 may comprise a transverse circular wall 42 provided with a plurality of circumferentially spaced longitudinally extending cage fingers 43 integral with circumferential marginal portions of the wall 42 and projecting from one side of wall 42. Each finger may have a curved inner face to facilitate guiding of the poppet valve element 36. Each cage finger 43 is provided at its remote end with an inturned finger segment 44 adapted to be received within an outwardly facing recess 45 provided in the inner end of the cylindrical extension 28 of the body member 25. The outer diameter of the transverse cage wall 42 is slightly less than the inner diameter of the internal flange 22 of the housing portion 19 so that said cage member may be readily received within the open end 21 of the housing 19 and be positioned substantially within the valve chamber 20.

Within the cage member 37 is carried the poppet valve element 38 which may include a hollow cylindrical member 47 having an upstream open end 48 and a wall 49 closing the downstream end of the cylinder member 47. Intermediate ends of the cylinder member 47 may be integrally formed an external annular flange 50, said flange providing an outer annular tapered valve seat 51 facing the external valve seat 33 and arranged in converging relation thereto. Upstream of valve seat 51 the cylinder member 47 is provided with an inner annular tapered valve seat 52 opposed to the internal valve seat 34 and adapted to seat thereagainst in metal-to-metal contact when the poppet valve element is in closed position. Adjacent to the inner valve seat 52 may be provided a plurality of circumferentially arranged circular ports 53 in the cylinder member 47. The upstream end of the cylinder member 47 is slidably received within the cylindrical extension 28.

The coil spring 40 may have one end seated against a shoulder 55 provided on the side of flange 50 opposite to the valve seat 51. The other end of spring 40 may be seated as at 56 on the transverse cage wall 42.

The annular resilient ring 39 may be of O ring type, having a circular section and made of selected elastic material to be unaffected by the type of fluid passed through the valve. The ring 39 is retained in operative position between the valve seats by the cage fingers 43.

In assembly of the check valve shown in Fig. 1, the poppet valve assembly 36 may be first assembled by placing the spring 40 in the cage member, inserting the poppet valve element 38 therewithin and seating the external flange 50 on one end of the spring, and then placing the seal ring 39 in position on the tapered outer annular seat 51. The cage member with the spring means, poppet valve element, and seal ring positioned therewithin may then be assembled with the male body member 25 by sleeving the inner end of the cylindrical extension 28 over the upstream end of cylinder member 47 and resiliently urging the finger segments 44 over the inner end of extension 28 until the finger segments snap into the recesses 45. The poppet valve assembly and the male body member may then be inspected and tested. The male body member 25 with the poppet valve assembly carried thereby may then be associated with the housing portion 19 by inserting the poppet valve assembly through the open end 21 and threadedly engaging the male body member therewith.

In operation of the check valve shown in Fig. 1, in closed position the spring 40 normally biases the poppet valve element upstream so that the inner valve seat 52 and the internal valve seat 34 are in metal-to-metal contact. The resilient ring 39 is compressed between the tapered seats 51 and 33. When the pressure of the fluid on the upstream end of the valve exceeds the biasing pressure of the spring 40, the poppet valve element is urged downstream. In such movement, it will be readily apparent that fluid between the transverse wall 42 of the cage member and the wall 49 of the poppet element tends to cushion said downstream movement and contributes to the biasing resistance of the spring means so as to prevent violent opening of the poppet valve element.

As the poppet valve element moves downstream, the transverse wall 49 of the element causes the fluid to be directed through the ports 53. Fluid passing through ports 53 flows over the upstream side of the resilient ring 39 and through the open spaces between the cage fingers 43. The main flow of fluid thus passes in cylindrical formation adjacent the wall surfaces of the chamber 20 and encircles the poppet valve assembly 36. At the downstream end of the chamber 20 the head portion 17 of the female body member may be provided with a tapered wall surface 58 for directing the fluid into the outlet port. It will thus be readily apparent that the spring means and a substantial portion of the poppet valve element are located in a position which does not obstruct the main flow of fluid through the valve chamber. The cage fingers 43 serve to guide the poppet valve element in its longitudinal movement by sliding contact of the circumferential edge 59 of the external flange 50 on the poppet valve element with inner surfaces of said fingers. In this embodiment the upstream portion of the cylinder member 47 of the poppet element also slidably engages in guiding relation the internal cylindrical surfaces of the cylindrical extension 28.

In the embodiments shown in Figs. 5 to 9 inclusive of this invention only differences in structure and function will be described in detail for the purposes of brevity and clarity. Parts of these following embodiments similar to those described in the embodiments shown in Fig. 1 will be given the same reference numeral followed by the same letter of the alphabet for each embodiment.

In Fig. 5 the check valve 15a differs from the embodiment shown in Fig. 1 in that poppet valve element 38a is provided with a conical front wall 65 facing upstream with its point extending into the bore 66 of the cylindrical extension 28a. The bore 66 is provided with an inner reduced portion 67 which defines at its inner end an inner tapered interval valve seat 34a. The conical wall 65 is of the same taper as seat 34a to provide metal-to-metal face contact when the valve is closed. The conical wall 65 terminates at its base in an annular radially outwardly facing step 68 which has a diameter approximately that of the inner diameter of resilient ring 39a and upon which ring 39a may be seated. An outer tapered valve seat 51a is provided adjacent to step 68 in opposed relation to external tapered annular seat 33a on the cylindrical extension. The poppet valve element 38a includes a cylindrical skirt 69 which encloses therewithin coil spring 40a. In fully open position the circular edge face 70 of skirt 69 may abut against the transverse wall 42a of the cage member 37a.

In this modification flow of fluid is facilitated through the annular opening between the resilient ring 39a and the inner end of the cylindrical extension 28a by the projection of the conical wall 65 into bore 66. Flow of fluid in the valve chamber 20a passes over and around the poppet valve assembly 36a, and the spring 40a enclosed within skirt 69 is completely out of the flow path. It should also be noticed that as the poppet valve element moves downstream during opening fluid within skirt 69 of the poppet valve element 38a acts as a fluid cushion for said poppet valve element.

In the modification shown in Fig. 6 the check valve 15b is similar to the embodiment shown in Fig. 5 with respect to the construction of the poppet valve element 38b, the male body member 25b and the enclosure of coil spring 40b within the skirt 72 of the poppet valve element.

In this modification the cage member 37b is differently constructed in that the cage member includes a cylindrical central solid wall portion 73 provided with relatively short cage fingers 74 extending to the cylindrical extension 28b for connection thereto as in the prior embodiments. An upstream edge 75 of the cylindrical portion 73 is positioned adjacent the upstream portion of resilient ring 39b when the poppet valve element 38b is in fully open position. In fully open position the poppet valve element 38b seats as at 76 on an internal shoulder provided on the cage member 37b. The cage member 37b also includes a conical downstream wall 77 directed toward the outlet port of the valve.

In this modification it will be noted that the path of fluid around the poppet valve assembly 36b is facilitated by the downstream conical wall 77. The function of the conical front wall 65b is the same as that described in Fig. 5 and the cooperable engagement of the opposed valve seats and the inner end of the cylindrical extension 28 and the poppet valve element are virtually the same. In this example, the cushioning effect of fluid within the cage member and poppet valve element is more pronounced since escape of fluid is restricted by the space between the skirt 72 and the wall 73.

In Fig. 7 the check valve 15c is substantially the same as that shown in Fig. 6 except for the connection of the poppet valve assembly 36c to the male member 25c. In this modification the cage member 37c includes a cylindrical solid wall 85 provided with a plurality of circumferentially spaced ports 86 therein adjacent to the inner end of extension 28c. Beyond the ports 86 the cylindrical wall 85 is provided with an outwardly inclined annular flange 87 adapted to be received between an annular positioning rib 88 provided on cylindrical extension 28c and an internal annular positioning rib 89 provided on the internal surface of housing 19c. It will be thus apparent that the poppet valve assembly 36c is not secured as a unit to the male body member 25c. The assembly 36c is assembled in the check valve by first inserting assembly 36c within the open end of the housing 19c until the outwardly inclined flange 87 is seated against positioning rib 89. The body member 25c may then be inserted in the open end of the housing means 19c and when ultimately positioned the positioning rib 88 bears against the flange 87.

It will be noted that interconnection of the housing means 19c and the body member 25c is slightly different in that the cylindrical extension is provided with an annular groove 90 to receive an O ring 39c and that threaded engagement as at 91 between the separable valve body members 25c and 16c is provided at the end of the housing means 19c.

In the modification shown in Fig. 8 the check valve 15d differs from the prior embodiments in the construction of cage member 37d and poppet valve element 38d. The cage member 37d includes a central cylindrical solid wall portion 73d having an upstream annular edge 75d positioned as described for the similar portions of the poppet valve element shown in Fig. 6. Cage fingers 74d engage the cylindrical extension 28d of the male body member 25d. At the downstream end of the cylindrical wall portion 73d the cage member 37d is provided with a conical wall 77d directed toward the outlet port and of somewhat thinner section than the conical wall 77 of the embodiment in Fig. 6.

Within cage member 37d the poppet valve element 38d is provided with a conical end wall 65d facing upstream and a cylindrical solid intermediate portion 79 concentric with the wall portion 73d and spaced therefrom. The portion 79 may be integral with a downstream conical wall 80 which is complementary to and may nest within conical wall 77d of the cage member when the poppet valve element is in open valve position. Between the portions 79 and 73d of the poppet valve element and cage member respectively may be positioned spring 40d. The spring means 40d has a seat at one end against an internal annular shoulder 81 provided on the cage member 77d. At its other end the spring means 40d may be seated against an annular snap ring 82 mounted in an annular groove in the cylindrical portion 79 of the poppet valve element 38d.

In this modification it will be apparent that the snap ring 82 guides the poppet valve element axially during its movement by contact with the cylindrical portion 73d of the cage member. In addition the complementary arrangement of the downstream conical wall 77d and 80 of the cage member and poppet valve element respectively tends to facilitate said guiding action and fluid which accumulates between the poppet valve element and the cage member serves as an effective cushion for opening movement of the poppet valve element.

In the modification shown in Fig. 9 the check valve 15e includes a poppet valve assembly 36e which is differently constructed than the prior poppet valve assemblies.

The poppet valve assembly 36e may comprise an openended cylindrical cage member 37e seated at one end as at 95 against an annular shoulder provided on the body member 16e and at its other end against an annular shoulder as at 96 provided on the inner end of the cylindrical extension 28e of the body member 25e. Adjacent each end the cylindrical cage member 37e may be provided with a plurality of circumferentially spaced upstream ports 97 and downstream ports 98.

A poppet valve element 38e is constructed similarly to the poppet valve elements shown in Figs. 5, 6 and 7. The poppet valve element 38e is limited in its downstream movement by an annular transverse disc 99 seated on a retaining ring 100 secured in an internal annular groove provided in the cage member 37e adjacent to the downstream ports 98. The disc 99 provides a seat for one end of the coil spring 40e, the other end of said spring being seated against the internal base of the conical front wall 65e.

In this check valve construction it will be noted that the poppet valve assembly positively directs flow of fluid through the upstream ports 97 into the annular space between the valve chamber 20e and the cylindrical solid wall portion of cage member 37e. Some cushioning effect is afforded opening movement of the poppet element because of the limited central opening 101 provided in the ported disc 99. Opening 101 may be varied in size to restrict flow of fluid to secure a selected cushioning effect.

The embodiment in Fig. 9 is also assembled somewhat differently than the prior embodiments in that the cage member 37e may first be positioned within the housing 19e with the disc 99, spring 40e, poppet valve element 38e and resilient ring 39e assembled therewithin. The male body member 25e may then be secured to the housing 19e for contacting the upstream end of the cage member and for firmly positioning the cage member.

It will thus be readily understood by those skilled in the art that the several embodiments of this invention described above afford a check valve which is provided with a novel poppet valve assembly. In each instance the poppet valve element is guided axially of the valve and is arranged within the cage member so as to be floating and self-centering. In each instance movement of the poppet valve element downstream upon opening of the valve is cushioned by fluid between the poppet valve element and a portion of the cage member. The biasing spring for the poppet valve element is in each embodiment positioned so as to not interfere with the flow of fluid. It will be noted that in the embodiments shown in Figs. 1, 5, 6 and 8, the poppet valve assembly is readily carried by the male body member and the operative parts of the valve may thus be inspected and tested before final assembly with the mating body member.

It has been found that the check valve embodying the features discussed above, in a working pressure range of from 10 to 10,000 pounds, is sensitive to a differential in pressure of only 6" of water column. At high pressures it will be readily understood that the dash-pot effect of cushioning fluid between the cage member and poppet element permits the valve to operate smoothly and without violently slamming open which may cause damage to various parts of the valve and which may reduce the life of the valve.

It will be understood that other modifications and changes may be made in the check valve construction provided above, and all such changes and modifications coming within the scope of the appended claims are embraced thereby.

We claim:

1. In a check valve, the combination of: a valve body including separable body members, one body member including a housing portion defining a valve chamber and having an open end, the other body member having an extension within said open end and provided with external and internal concentric oppositely tapered valve seats; and a poppet valve assembly insertable through said open end for operative positioning within said valve chamber, said assembly comprising a cage member spaced from walls of the valve chamber and having one end positioned by one of said body members, a poppet valve element slidably guided within the cage member, inner and outer concentric tapered valve seats on said poppet valve element, a resilient seal ring of circular cross section within the cage member between opposed outer and external valve seats on said poppet valve element and the said extension respectively, and a coil spring within the cage member for normally biasing the poppet valve element for contact of said inner and internal valve seats and for deforming said resilient seal ring between said outer and external valve seats.

2. A check valve as defined in claim 1 wherein said cage member includes a transverse imperforate wall and said poppet valve element includes an opposed wall in spaced relation to said transverse wall whereby fluid between said walls serves to cushion movement of the poppet valve element during opening of the valve.

3. A check valve as defined in claim 1 wherein said valve poppet element includes an annular flange intermediate its ends having a circumferential edge in guiding slidable contact with said cage member.

4. In combination, a check valve comprising separable body members, one body member being provided with a chamber and the other body member being provided with an extension extending into one end of said chamber; a valve assembly supported and carried by said extension for positioning within said chamber, said valve assembly including a poppet valve element provided with an imperforate transverse wall facing upstream; inwardly converging tapered valve seats on said valve element and on the end of said extension; a seal ring normally supported by said valve element between said valve seats; a cage member encompassing said valve element and carried by said extension, said cage member retaining said seal ring in operative position on said valve element; and spring means between said cage member and said poppet valve element for biasing said valve element upstream.

5. A valve means comprising means defining a valve chamber having upstream and downstream ends and provided with inwardly converging valve seat means at one end of said chamber; a valve assembly within said chamber including a cage member extending over said valve seat means, a valve element movable within the cage member, guided thereby, and provided with inwardly converging valve seat means opposed to said valve seat means at the end of said valve chamber, spring means within said cage member for biasing the valve element toward said one end of said chamber, and a seal ring disposed between said inwardly converging valve seat means on said valve element and at one end of said chamber and retained by the cage member in operative position on said valve element during relative movement between the valve element and said cage member.

6. In a check valve, the combination of: a valve body including a body member having a housing portion defining a valve chamber and having an open end, a mating body member having an extension receivable within said open end; a valve assembly carried as a unit on said extension and insertable through said open end for positioning within said valve chamber, said assembly comprising a cage member secured to said extension and spaced from walls of the valve chamber, a poppet valve element slidably guided within the cage member, a spring means within the cage member biasing the poppet valve element toward said extension; valve seat means on opposed faces of said valve element and said extension; an annular resilient seal ring on the valve element between said valve seat means and deformable therebetween when said poppet valve element is in closed position, said seal ring being retained on said valve element by said cage member; said cage member including a cylindrical wall and a conical end wall directed downstream; and said valve element including a cylindrical skirt and a conical end wall complementary to and nested within said cage member for coaxially guiding and aligning said poppet valve element with said cage member.

7. In combination, a check valve comprising: separable body members, one body member being provided with a chamber and the other body member being provided with an extension extending into one end of said chamber; a valve assembly positioned within said chamber between said members, said assembly including a poppet valve element provided with an imperforate transverse wall facing upstream; inwardly converging valve seats on said valve element and on the end of said extension; a seal ring normally supported by said valve element between said valve seats; a cage member encompassing said valve element, being spaced from the walls of the valve chamber and having one end positioned by one of said body members, said cage member retaining said seal ring in operative position on said valve element; and spring means between said cage member and said poppet valve element for biasing said valve element upstream.

8. In combination, a check valve comprising: separable body members, one body member being provided with a chamber and the other body member being provided with an extension defining one end of said chamber: a valve assembly supported and carried by said extension for positioning within said chamber, said valve assembly including a movable valve element provided with an imperforate wall; tapered valve seat means on said valve element and on the end of said extension; a seal ring normally supported by said valve element between said valve seat means; a cage member supported from said extension and guiding said valve element in its movement, said cage member retaining said seal ring in operative position on said valve element; and spring means between said cage member and said valve element for biasing said valve element upstream, said valve seat means including outer annular valve seats cooperable with said seal ring and inner annular valve seats providing metal-to-metal contact between said extension and valve element in valve closed position, said outer valve seats having inwardly converging surfaces.

References Cited in the file of this patent
UNITED STATES PATENTS

| | | |
|---|---|---|
| 481,001 | Case | Aug. 16, 1892 |
| 1,269,616 | Le Bozec | June 18, 1918 |
| 1,672,127 | Holley | June 5, 1928 |
| 1,776,060 | Beckwith | Sept. 16, 1930 |
| 1,950,847 | Harrub | Mar. 13, 1934 |
| 2,206,356 | Hutchings | July 2, 1940 |
| 2,239,405 | Stenger | Apr. 22, 1941 |
| 2,608,376 | Adams | Aug. 26, 1952 |
| 2,649,277 | Blackford | Aug. 18, 1953 |
| 2,655,936 | Wexler | Oct. 20, 1953 |
| 2,673,062 | Cornelius | Mar. 23, 1954 |
| 2,699,179 | Hansen | Jan. 11, 1955 |
| 2,713,989 | Bryant | July 26, 1955 |
| 2,720,219 | Grove | Oct. 11, 1955 |
| 2,745,628 | Carlson | May 15, 1956 |

FOREIGN PATENTS

| | | |
|---|---|---|
| 968,435 | France | Apr. 19, 1950 |